United States Patent
Akkarakaran et al.

(10) Patent No.: US 11,076,286 B2
(45) Date of Patent: Jul. 27, 2021

(54) BEAM-SWITCHING CAPABILITY INDICATION IN WIRELESS NETWORKS THAT UTILIZE BEAMFORMING

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 118 days.

(21) Appl. No.: 16/438,278

(22) Filed: Jun. 11, 2019

(65) Prior Publication Data

US 2019/0394634 A1 Dec. 26, 2019

Related U.S. Application Data

(60) Provisional application No. 62/688,362, filed on Jun. 21, 2018.

(51) Int. Cl.
*H04W 8/22* (2009.01)
*H04L 1/00* (2006.01)
(Continued)

(52) U.S. Cl.
CPC ............ *H04W 8/22* (2013.01); *H04L 1/0026* (2013.01); *H04L 5/005* (2013.01); *H04L 25/0226* (2013.01); *H04W 72/005* (2013.01); *H04W 72/046* (2013.01); *H04W 72/0446* (2013.01); *H04W 88/06* (2013.01)

(58) Field of Classification Search
None
See application file for complete search history.

(56) References Cited

U.S. PATENT DOCUMENTS

2010/0014463 A1* 1/2010 Nagai ............... H04W 72/0426
370/328
2017/0265111 A1* 9/2017 Fan ..................... H04B 7/0617
(Continued)

FOREIGN PATENT DOCUMENTS

EP 3334070 A1 6/2018

OTHER PUBLICATIONS

International Search Report and Written Opinion—PCT/US2019/036828—ISA/EPO—dated Aug. 9, 2019.
(Continued)

*Primary Examiner* — Andre Tacdiran
(74) *Attorney, Agent, or Firm* — MG-IP Law, P.C.

(57) ABSTRACT

Disclosed are techniques for enhanced positioning methods that are suitable for use in a wireless network that utilizes beamformed communication. More particularly, a user equipment (UE) may determine a capability for a number of beam switches that the UE supports per slot for one or more slot types and transmit, to a network node, capability information indicating the capability for the number of beam switches that the UE supports per slot in slots having the one or more slot types. As such, the network node may transmit and the UE may receive one or more signals across a number of beams based on the capability indicated in the capability information for the number of beam switches per slot based on a slot type associated with a slot in which the one or more signals are transmitted.

30 Claims, 12 Drawing Sheets

(51) Int. Cl.
*H04L 5/00* (2006.01)
*H04L 25/02* (2006.01)
*H04W 72/00* (2009.01)
*H04W 72/04* (2009.01)
*H04W 88/06* (2009.01)

(56) References Cited

U.S. PATENT DOCUMENTS

| | | | |
|---|---|---|---|
| 2019/0261195 A1* | 8/2019 | Cheng | H04W 8/22 |
| 2019/0349915 A1* | 11/2019 | Ahn | H04B 7/0695 |
| 2019/0356444 A1* | 11/2019 | Noh | H04L 5/0048 |
| 2019/0387440 A1* | 12/2019 | Yiu | H04W 36/0072 |
| 2020/0037273 A1* | 1/2020 | Yokomakura | H04W 56/00 |
| 2020/0128412 A1* | 4/2020 | Kazmi | H04W 24/02 |
| 2020/0178134 A1* | 6/2020 | Yang | H04W 36/305 |
| 2020/0304263 A1* | 9/2020 | Zhang | H04L 29/06 |
| 2020/0305123 A1* | 9/2020 | Takeda | H04B 1/7143 |
| 2020/0313823 A1* | 10/2020 | Zhang | H04B 7/0626 |

OTHER PUBLICATIONS

"RAN4 AH-1801 Meeting report", 3GPP Draft; R4-1801402, 3rd Generation Partnership Project (3GPP), Mobile Competence Centre ; 650, Route Des Lucioles ; F-06921 Sophia-Antipolis Cedex; France, vol. RAN WG4, No. Athens Greece; Feb. 26, 2018-Mar. 2, 2018, Feb. 22, 2018 (Feb. 22, 2018), XP051403335, 478 Pages, Retrieved from the Internet URL:http://www.3gpp.org/ftp/tsg%5Fran/WG4%5FRadio/TSGR4%5F86/Docs/ [retrieved on Feb. 22, 2018], Sections: 9.10.1, 9.10.2, 9.10.3.

\* cited by examiner

BEAM-SWITCHING CAPABILITY INDICATION IN WIRELESS NETWORKS THAT UTILIZE BEAMFORMING

CROSS-REFERENCE TO RELATED APPLICATION

The present application for patent claims the benefit of U.S. Provisional Patent Application No. 62/688,362 entitled "BEAM-SWITCHING CAPABILITY INDICATION IN WIRELESS NETWORKS THAT UTILIZE BEAMFORMING," filed Jun. 21, 2018, assigned to the assignee hereof, and expressly incorporated herein by reference in its entirety.

TECHNICAL FIELD

Aspects described herein generally relate to wireless communication systems, and in particular, to indicating beam-switching capabilities to a network node in a wireless network that utilizes beamformed communication.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein generally refers to both MIMO and massive MIMO. MIMO is a method to multiply the capacity of a radio link by using multiple transmit and receive antennas to exploit multipath propagation, which occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than a single RF signal would be sent, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, the RF signal is broadcasted in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). However, the unique challenges of heavy path-loss faced by mmW communication systems necessitate new techniques, which are not present in third generation (3G) and/or fourth generation (4G) wireless communication systems. Accordingly, there may be a need to enhance positioning methods that are traditionally used in wireless networks to take into account the unique challenges that may arise with beamformed communication.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a method a user equipment (UE) may comprise determining a capability for a number of beam switches that the UE supports per slot for each slot of one or more slots based on a slot type of that slot and/or based on one or more other capabilities associated with the UE to receive one or more signals across a number of beams. The method may also comprise transmitting, to a network node, capability information indicating the capability for the number of beam switches that the UE supports per slot. The method may further comprise receiving, at the UE, the one or more signals across the number of beams based on the capability indicated in the capability information for the number of beam switches per slot associated with a slot in which the one or more signals are transmitted.

According to various aspects, a user equipment (UE) may comprise at least one processor, at least one transmitter, and at least one receiver. The at least one processor may be configured to determine a capability for a number of beam switches supported by the apparatus per slot for each slot of one or more slots based on a slot type of that slot and/or based on one or more other capabilities associated with the UE to receive one or more signals across a number of beams. The transmitter may be configured to transmit, to a network node, capability information indicating the capability for the number of beam switches supported by the apparatus per slot. The receiver may be configured to receive the one or more signals across the number of beams based on the capability indicated in the capability information for the number of beam switches per slot associated with a slot in which the one or more signals are transmitted.

According to various aspects, a user equipment (UE) may comprise means for determining a capability for a number of beam switches that the apparatus supports per slot for each slot of one or more slots based on a slot type of that slot and/or based on one or more other capabilities associated with the apparatus to receive one or more signals across a number of beams. The UE may also comprise means for transmitting, to a network node, capability information indicating the capability for the number of beam switches that the UE supports per slot. The UE may further comprise means for receiving the one or more signals across the number of beams based on the capability indicated in the capability information for the number of beam switches per slot associated with a slot in which the one or more signals are transmitted.

According to various aspects, a computer-readable medium may have computer-executable instructions for a user equipment (UE) recorded thereon. The computer-executable instructions may comprise one or more instructions causing the UE to determine a capability for a number of beam switches supported by the apparatus per slot for each slot of one or more slots based on a slot type of that slot and/or based on one or more other capabilities associated with the apparatus to receive one or more signals across a number of beams. The computer-executable instructions may also comprise one or more instructions causing the UE to transmit, to a network node, capability information indicating the capability for the number of beam switches supported by the apparatus per slot. The computer-executable instructions may further comprise one or more instructions causing the UE to receive the one or more signals across the number of beams based on the capability indicated in the capability information for the number of beam switches per slot associated with a slot in which the one or more signals are transmitted.

According to various aspects, a method of a network node may comprise receiving capability information from a user equipment (UE) indicating a capability for a number of beam switches that the UE supports per slot for each slot of one or more slots based on a slot type of that slot and/or based on one or more other capabilities associated with the UE to receive one or more signals across a number of beams. The method may also comprise transmitting, to the UE, the one or more signals in a slot, wherein the one or more transmitted signals are transmitted across the number of beams based on the capability indicated in the capability information for the number of beam switches per slot associated with the slot in which the one or more signals are transmitted.

According to various aspects, a network node may comprise a receiver configured to receive capability information from a user equipment (UE) indicating a capability for a number of beam switches that the UE supports per slot for each slot of one or more slots based on a slot type of that slot and/or based on one or more other capabilities associated with the UE to receive one or more signals across a number of beams. The network node may also comprise a transmitter configured to transmit, to the UE, the one or more signals in a slot, wherein the one or more transmitted signals are transmitted across the number of beams based on the capability indicated in the capability information for the number of beam switches per slot associated with the slot in which the one or more signals are transmitted According to various aspects, a network node may comprise means for receiving capability information from a user equipment (UE) indicating a capability for a number of beam switches that the UE supports per slot for each slot of one or more slots based on a slot type of that slot and/or based on one or more other capabilities associated with the UE to receive one or more signals across a number of beams. The network node may also comprise means for transmitting, to the UE, the one or more signals in a slot, wherein the one or more transmitted signals are transmitted across the number of beams based on the capability indicated in the capability information for the number of beam switches per slot associated with the slot in which the one or more signals are transmitted.

According to various aspects, a computer-readable medium may have computer-executable instructions for a network node recorded thereon. The computer-executable instructions may comprise one or more instructions causing the network node to receive capability information from a user equipment (UE) indicating a capability for a number of beam switches that the UE supports per slot for each slot of one or more slots based on a slot type of that slot and/or based on one or more other capabilities associated with the UE to receive one or more signals across a number of beams. The computer-executable instructions may also comprise one or more instructions causing the network node to transmit, to the UE, the one or more signals in a slot, wherein the one or more transmitted signals are transmitted across the number of beams based on the capability indicated in the capability information for the number of beam switches per slot associated with the slot in which the one or more signals are transmitted.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
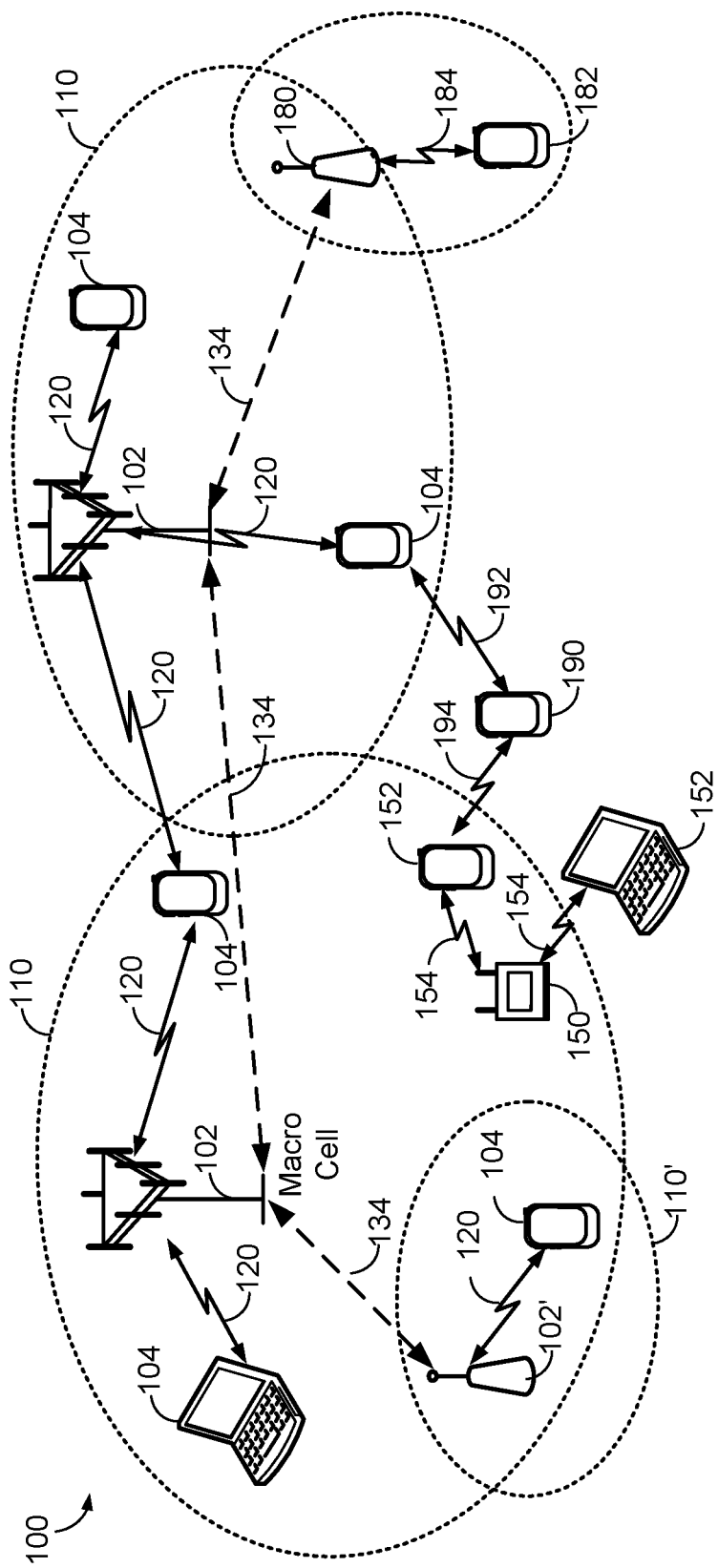
FIG. 1 illustrates an exemplary wireless communications system, according to various aspects of the disclosure.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any aspect or embodiment described herein as "exemplary" is not necessarily to be construed as preferred or advantageous over other aspects or embodiments. Likewise, the terms "aspects" and "embodiments" do not require that all aspects or embodiments include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to an LTE network, gNodeBs (gNBs) where the wireless communications system 100 corresponds to a 5G network, and/or a combination thereof, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
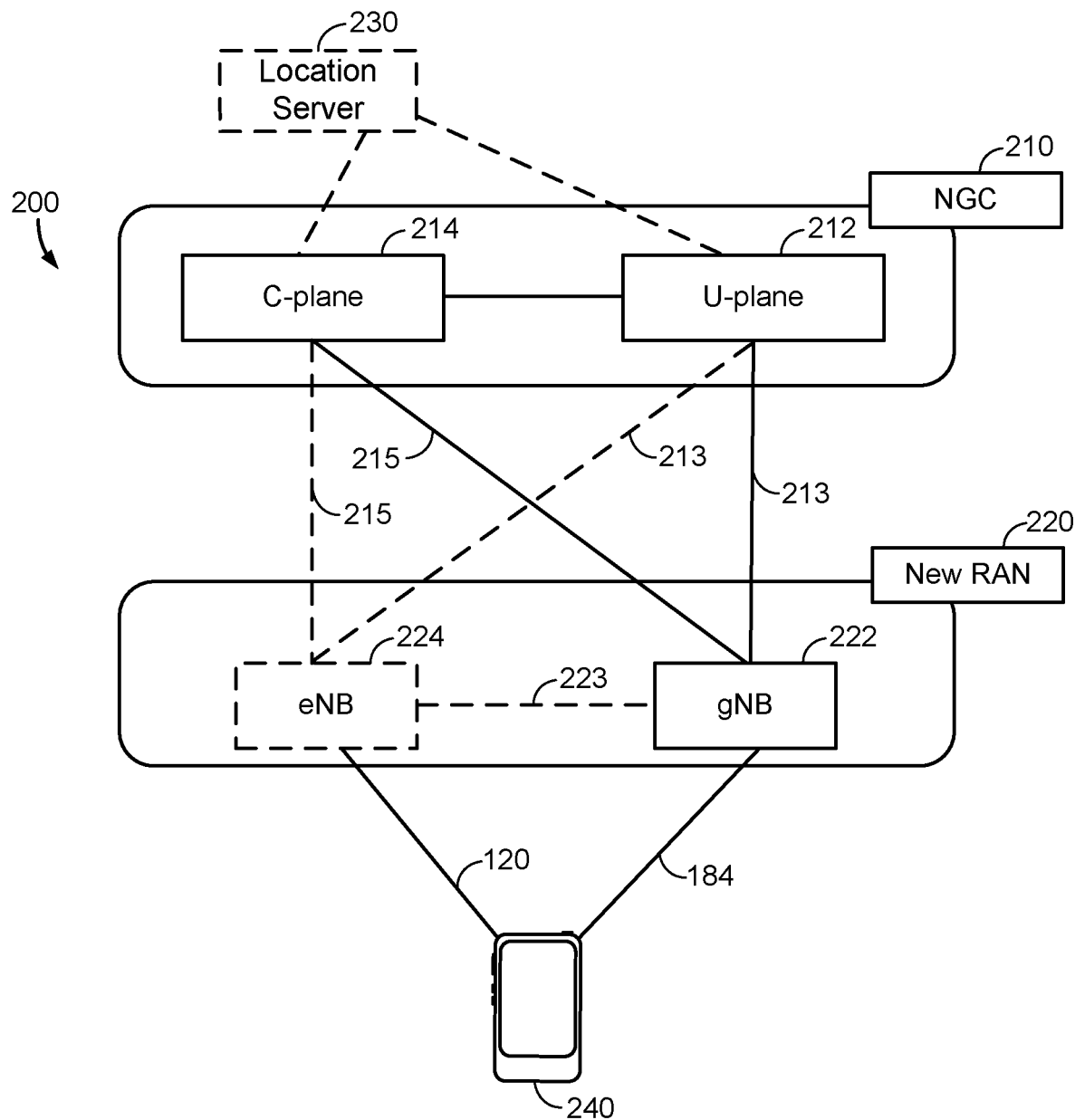
FIGS. 2A and 2B illustrate example wireless network structures, according to various aspects of the disclosure.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
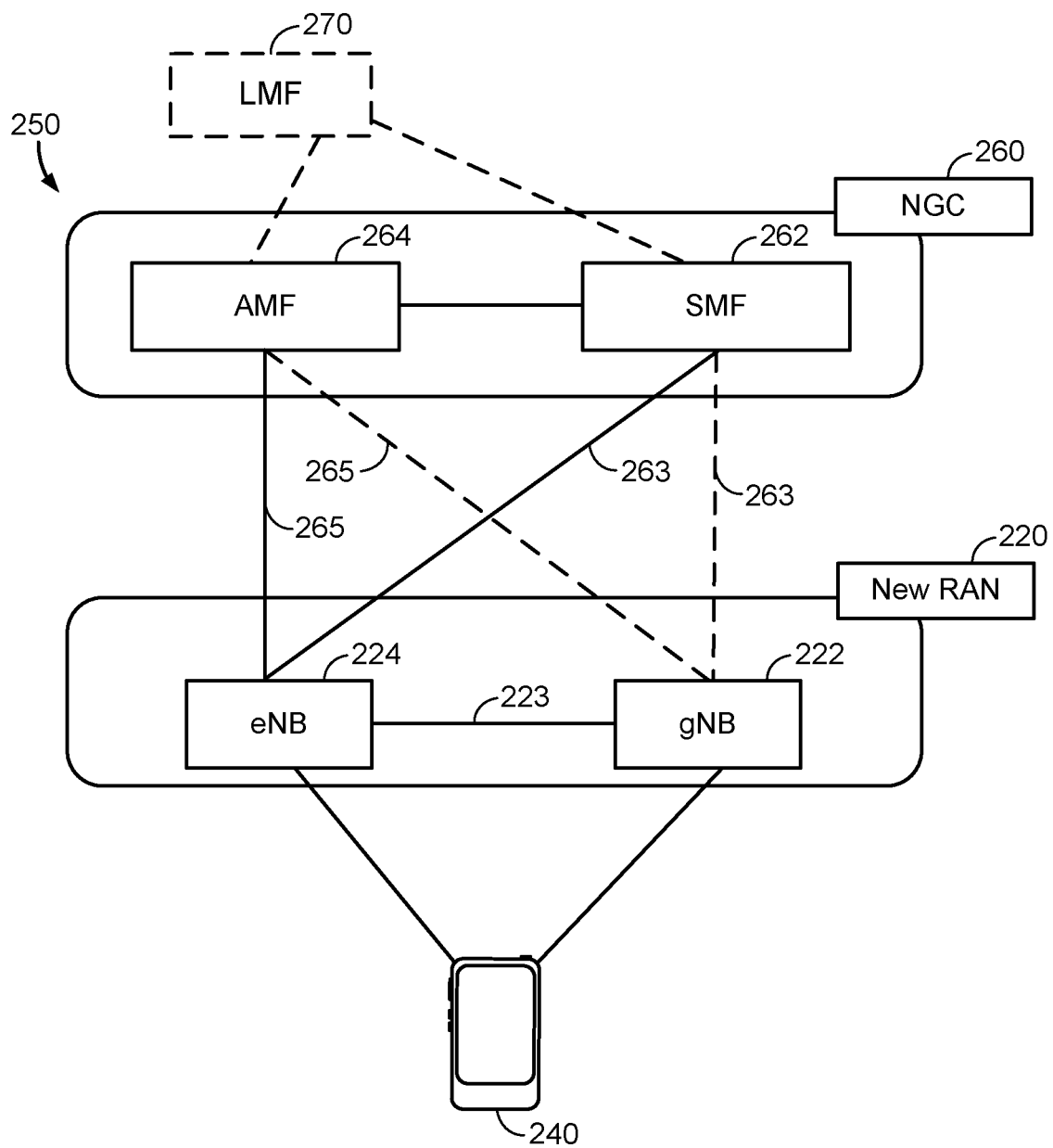

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
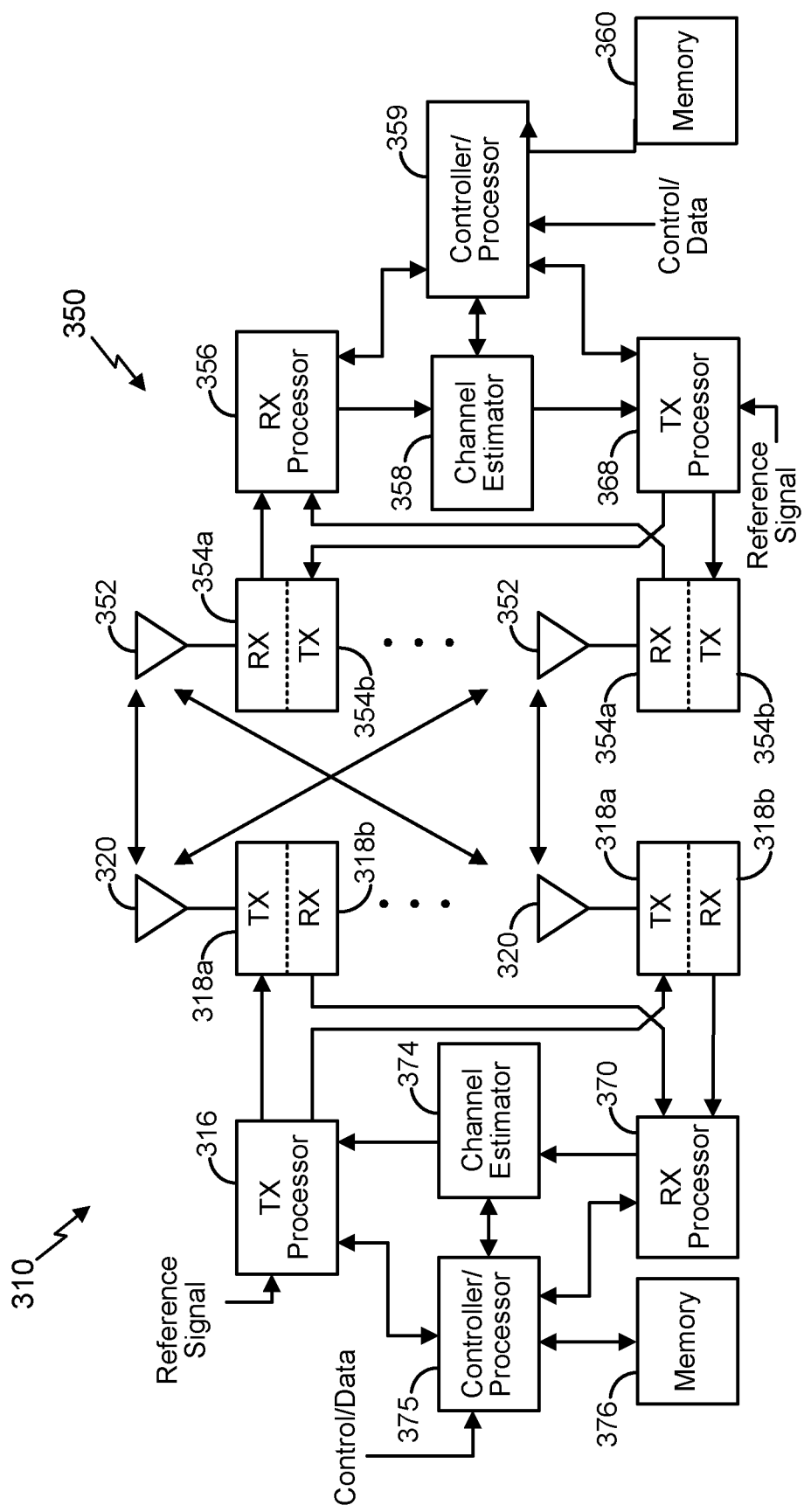
FIG. 3 illustrates an exemplary base station and an exemplary UE in an access network, according to various aspects of the disclosure.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4:
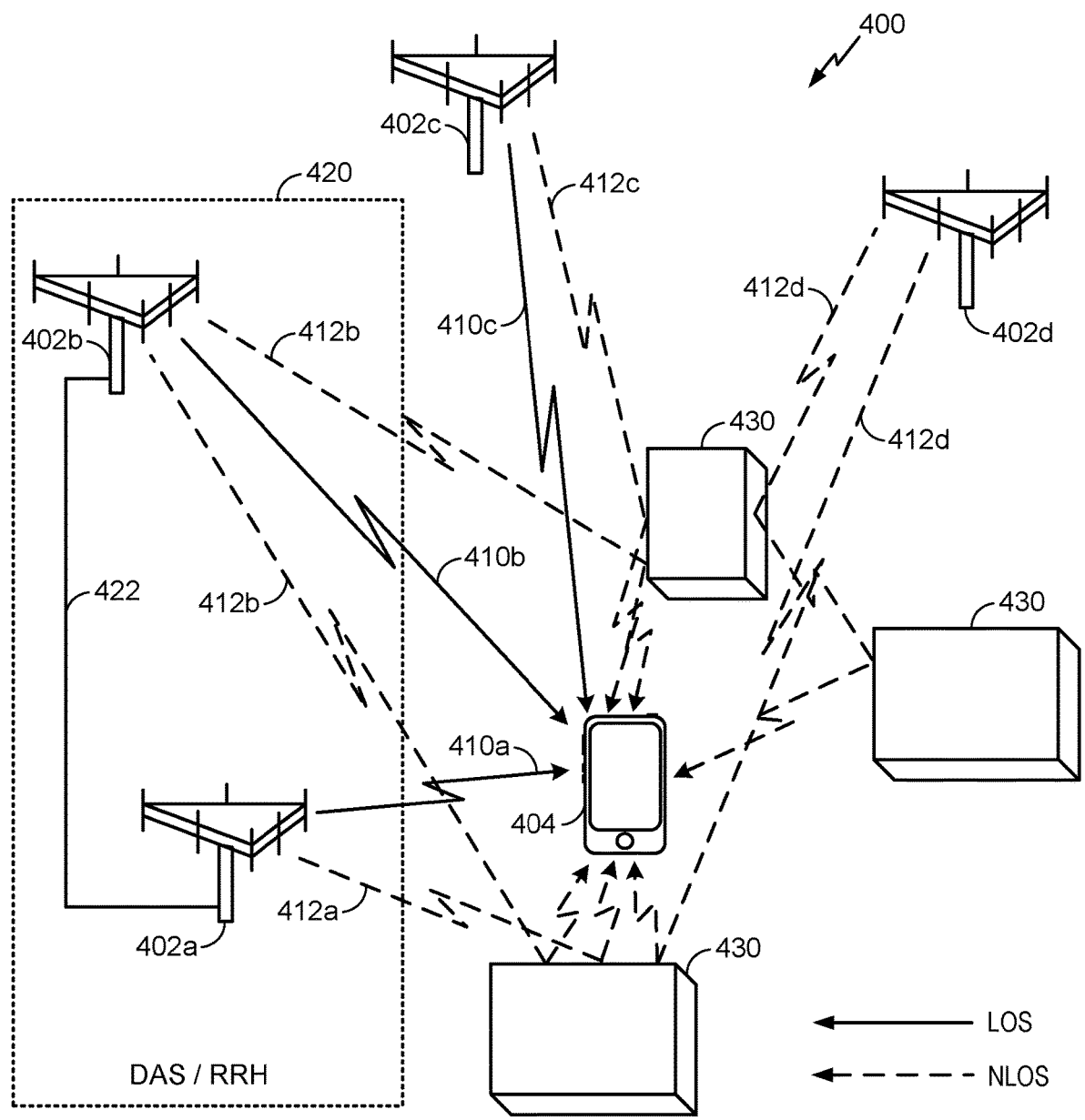
FIG. 4 illustrates an exemplary wireless communications system, according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402. It should also be noted that at two-dimensional and three-dimensional positions may be determined at different times. For example, the two-dimensional position may initially be determined, and at a later time, altitude of the device may also be determined.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signal blocks (SSB), Timing Reference Signals (TRS), etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that may be enabled by precise ToA/ToF, such as round-trip time estimation based methods. Note that the UE may be able to determine its own positioning from these measurements. Alternatively or in addition thereto, the UE may be configured or request that the network determine the UE's position based on the measurements. In other words, both network and UE based approaches are possible.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The assistance data may be requested by the UE. Alternatively or in addition thereto, the assistance data may be provided to the UE unsolicited. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the network entity (e.g. location server, base station, etc.) can determine the distance between the UE 404 and the measured network nodes and the UE 404 or the network entity (e.g. location server, base station, etc.) may calculate the location of the UE 404.

The term "position estimate" is used herein to refer to an estimate of a position for a UE 404, which may be geographic (e.g., may comprise a latitude, longitude, and possibly altitude) and/or civic (e.g., may comprise a street address, building designation, or precise point or area within or nearby to a building or street address, such as a particular entrance to a building, a particular room or suite in a building, a floor level in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where a LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over a LOS path 410a and an NLOS path 412a, base station 402b transmitting over a LOS path 410b and two NLOS paths 412b, base station 402c transmitting over a LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication, between the base station 402 and the UE 404, may be carrying RF signals that arrive at UE 404 with the highest signal strength (as indicated by, e.g., the Reference Signal Received Power (RSRP) or SINR in the presence of a directional interfering signal), whereas the beams of interest for position estimation may be carrying RF signals that excite the shortest path or LOS path (e.g., a LOS path 410). In some frequency bands and for antenna systems typically used, these will be the same beams. However, in other frequency bands, such as mmW, where typically a large number of antenna elements can be used to create narrow transmit beams, they may not be the same beams. As described below with reference to FIG. 5, in some cases, the signal strength of RF signals on the LOS path 410 may be weaker (e.g., due to obstructions) than the signal strength of RF signals on an NLOS path 412, over which the RF signals arrive later due to propagation delay.

Figure 5:
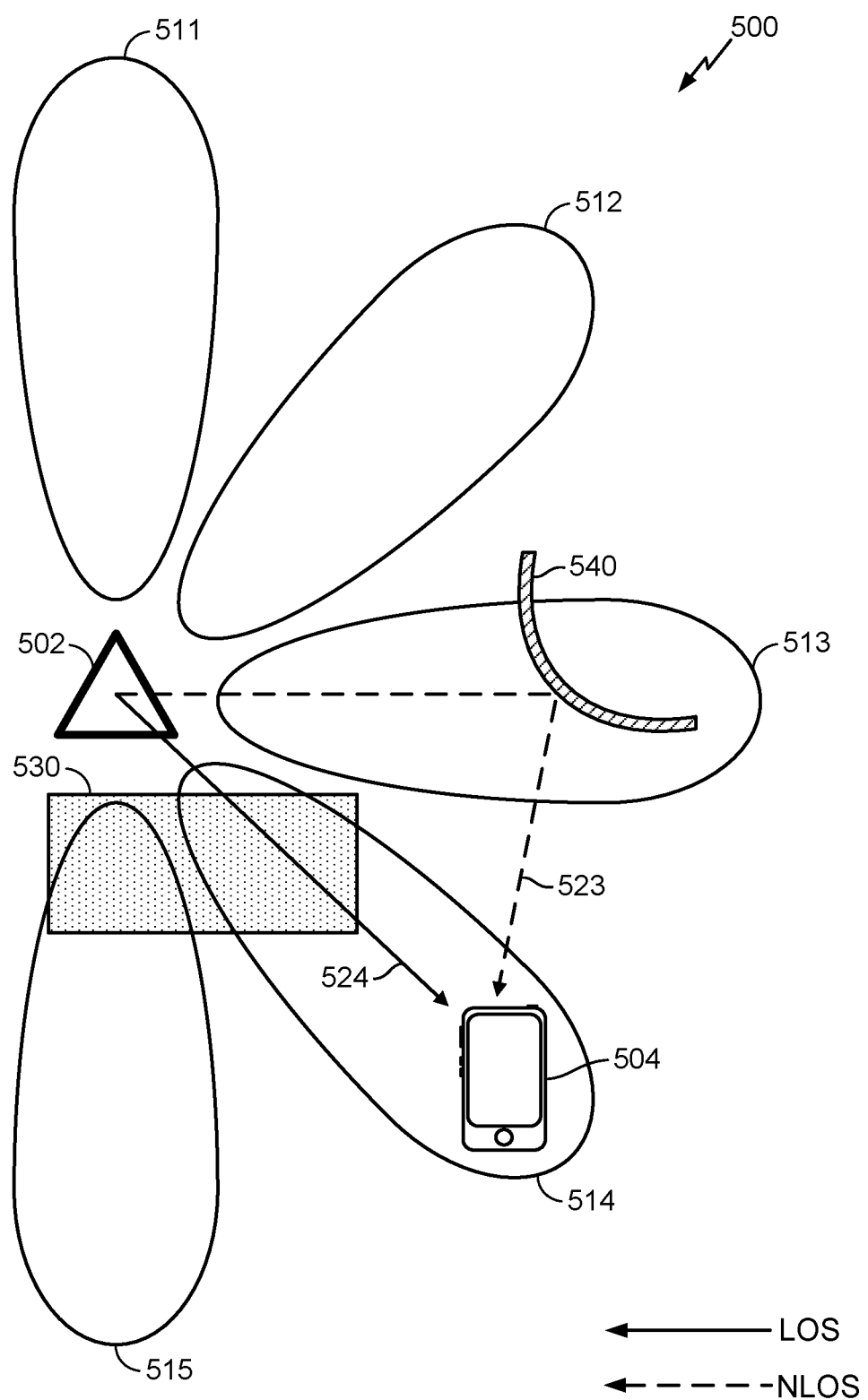
FIG. 5 illustrates an exemplary wireless communications system, according to various aspects of the disclosure.

FIG. 5 illustrates an exemplary wireless communications system 500 according to various aspects of the disclosure. In the example of FIG. 5, a UE 504, which may correspond to UE 404 in FIG. 4, is attempting to calculate an estimate of its position, or to assist another entity (e.g., a base station or core network component, another UE, a location server, a third party application, etc.) to calculate an estimate of its position. The UE 504 may communicate wirelessly with a base station 502, which may correspond to one of base stations 402 in FIG. 4, using RF signals and standardized protocols for the modulation of the RF signals and the exchange of information packets.

As illustrated in FIG. 5, the base station 502 is utilizing beamforming to transmit a plurality of beams 511-515 of RF signals. Each beam 511-515 may be formed and transmitted by an array of antennas of the base station 502. Although FIG. 5 illustrates a base station 502 transmitting five beams, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 5, the UE 504 receives an NLOS data stream 523 of RF signals transmitted on beam 513 and a LOS data stream 524 of RF signals transmitted on beam 514. Although FIG. 5 illustrates the NLOS data stream 523 and the LOS data stream 524 as single lines (dashed and solid, respectively), as will be appreciated, the NLOS data stream 523 and the LOS data stream 524 may each comprise multiple rays (i.e., a "cluster") by the time they reach the UE 504 due, for example, to the propagation characteristics of RF signals through multipath channels. For example, a cluster of RF signals is formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS data stream 523 is not originally directed at the UE 504, although, as will be appreciated, it could be, as are the RF signals on the NLOS paths 412 in FIG. 4. However, it is reflected off a reflector 540 (e.g., a building) and reaches the UE 504 without obstruction, and therefore, may still be a relatively strong RF signal. In contrast, the LOS data stream 524 is directed at the UE 504 but passes through an obstruction 530 (e.g., vegetation, a building, a hill, a disruptive environment such as clouds or smoke, etc.), which may significantly degrade the RF signal. As will be appreciated, although the LOS data stream 524 is weaker than the NLOS data stream 523, the LOS data stream 524 will arrive at the UE 504 before the NLOS data stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 514). That is, even if beam 513 (the NLOS beam) were to weakly excite the LOS path (due to the propagation characteristics of RF signals, even though not being focused along the LOS path), that weak signal, if any, of the LOS path of beam 513 may not be as reliably detectable (compared to that from beam 514), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference RF signals transmitted by the base station 502, the beam of interest for the data communication session may be the beam 513, as it is carrying the unobstructed NLOS data stream 523. The beam of interest for position estimation, however, would be the beam 514, as it carries the strongest LOS data stream 524, despite being obstructed.

Figure 6A:
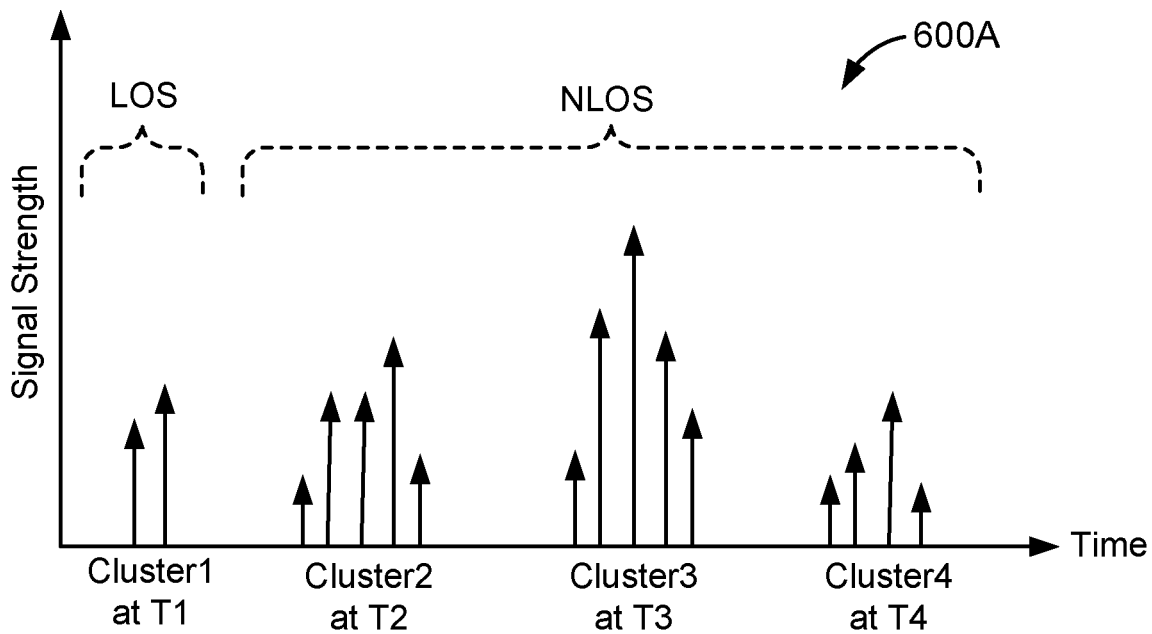
FIG. 6A is a graph showing the RF channel response at a UE over time, according to various aspects of the disclosure.
Figure 6B:
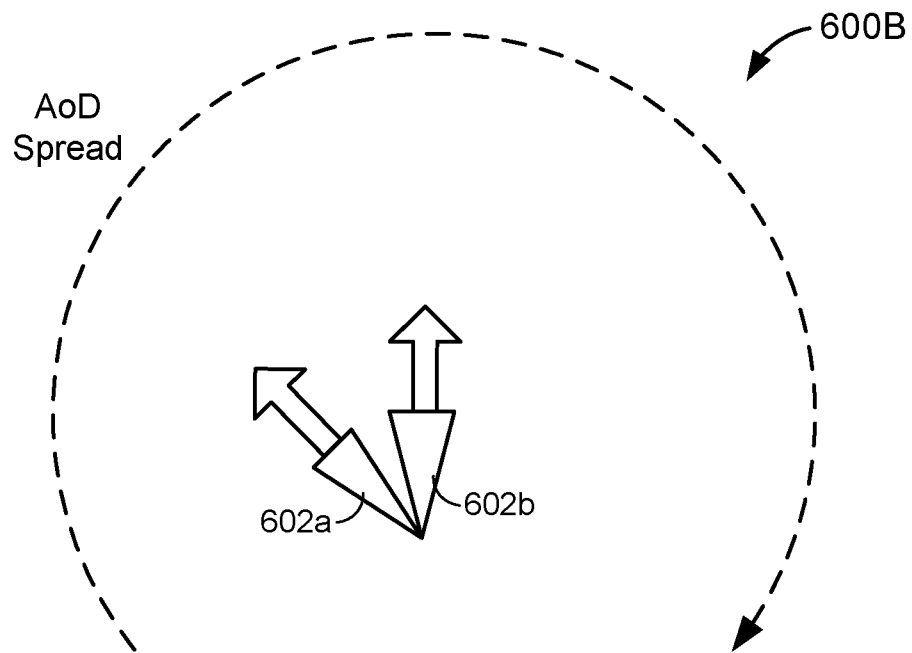
FIG. 6B illustrates an exemplary separation of clusters in Angle of Departure (AoD) according to various aspects of the disclosure.

FIG. 6A is a graph 600A showing the RF channel response at a receiver (e.g., UE 504) over time according to various aspects of the disclosure. Under the channel illustrated in FIG. 6A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6A, because the first cluster of RF signals at time T1 arrives first, it is presumed to be the LOS data stream (i.e., the data stream arriving over the LOS or the shortest path), and may correspond to the LOS data stream 524. The third cluster at time T3 is comprised of the strongest RF signals, and may correspond to the NLOS data stream 523. Seen from the transmitter's side, each cluster of received RF signals may comprise the portion of an RF signal transmitted at a different angle, and thus each cluster may be said to have a different angle of departure (AoD) from the transmitter. FIG. 6B is a diagram 600B illustrating this separation of clusters in AoD. The RF signal transmitted in AoD range 602a may correspond to one cluster (e.g., "Cluster1") in FIG. 6A, and the RF signal transmitted in AoD range 602b may correspond to a different cluster (e.g., "Cluster3") in FIG. 6A. Note that although AoD ranges of the two clusters depicted in FIG. 6B are spatially isolated, AoD ranges of some clusters may also partially overlap even though the clusters are separated in time. For example, this may arise when two separate buildings at same AoD from the transmitter reflect the signal towards the receiver. Note that although FIG. 6A illustrates clusters of two to five channel taps, as will be appreciated, the clusters may have more or fewer than the illustrated number of channel taps.

As in the example of FIG. 5, the base station may utilize beamforming to transmit a plurality of beams of RF signals such that one of the beams (e.g., beam 514) is directed at the AoD range 602a of the first cluster of RF signals, and a different beam (e.g., beam 513) is directed at the AoD range 602b of the third cluster of RF signals. The signal strength of clusters in post-beamforming channel response (i.e., the channel response when the transmitted RF signal is beamformed instead of omni-directional) will be scaled by the beam gain along the AoD of the clusters. In that case, the beam of interest for positioning would be the beam directed at the AoD of the first cluster of RF signals, as they arrive first, and the beam of interest for data communications may be the beam directed at the AoD of the third cluster of RF signals, as they are the strongest.

In general, when transmitting an RF signal, the transmitter does not know what path it will follow to the receiver (e.g., UE 504) or at what time it will arrive at the receiver, and therefore transmits the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit beamforming, receive beamforming may also be used in conjunction with transmit beamforming in certain embodiments.

According to various aspects, as will be apparent from the foregoing description, beamformed communication (including transmit beamforming, receive beamforming, and/or combinations thereof) are expected to become more and more widespread in many wireless network deployments, including but not limited to wireless networks that operate in mmW and sub-6 GHz bands. In the foregoing description, certain techniques are described to identify and report one or more beam(s) of interest that are suitable for position estimation such that a node may receive a sufficient number of shortest path beams that can be accurately measured to calculate, or assist the calculation of, a position estimate associated with the node. In various use cases, this may involve measuring and reporting an OTDOA from individual network nodes and/or RSTDs between reference RF signals received from pairs of network nodes (e.g., different base stations or different antennas or transmission points belonging to the same base station). As such, due to the unique challenges of heavy path-loss faced in mmW communication systems and other wireless networks that utilize beamformed communication, the following description provides various enhanced methods to support positioning in wireless networks that utilize beamformed communications.

More particularly, in wireless networks that operate in mmW and sub-6 GHz bands, beamforming may be utilized when transmitting positioning reference signals (PRS) to combat high path-loss and allow PRS reception from network nodes at multiple geographically separated sites, wherein each network node may correspond to a base station, a cell of a base station, a remote radio head, an antenna of a base station where the locations of the antennas of a base station are distinct from the location of the base station itself, etc. For example, as described in further detail, positioning accuracy may be substantially improved when performing OTDOA-based positioning methods based on Reference Signal Time Difference (RSTD) measurements from geographically separated network nodes, wherein the accuracy may further increase as the number of network nodes hearable at a given UE increases. Furthermore, even from a single site, sending the PRS on multiple beams can be helpful because different beams may travel along different paths and experience different reflections. In that context, ideal positioning accuracy may be achieved when measurements are taken based on the LOS beam. However, the LOS beam may be blocked and/or reflected, in which case the beam with the earliest arrival time may yield the most accurate position. In other words, as noted above, the best beam for positioning purposes may not always be the strongest beam (e.g., the beam with the highest RSRP), as that beam may not have the earliest arrival time. Furthermore, even though the LOS beam(s) may be considered ideal for positioning purposes, the LOS beam(s) may not have the earliest arrival time or may not arrive at all due to blockage, reflection, and/or other factors. As such, transmitting the PRS using multiple beams can provide substantial benefits because the multiple beams may travel different paths and increase the chances for an accurate position estimate. Further still, beam-sweeping may be necessary for any UEs that have not gone through beam training regardless of whether there is any signal blockage or reflection in order to allow those UEs to determine the appropriate beam(s) to monitor.

According to various aspects, the approach taken in LTE and other legacy wireless networks is to send PRS on a comb of frequency tones. For example, Orthogonal frequency division multiplexing (OFDM) is a multi-carrier modulation technique that partitions the overall system bandwidth into multiple (K) orthogonal subbands, which are also called tones, subcarriers, and/or frequency bins, wherein a frequency comb may generally refer to a set of carriers. As such, there may be several resource elements (REs) in a given OFDM symbol, whereby sending the PRS on the comb of frequency tones may mean that the PRS is sent on a subset of the resource elements in a predefined pattern (e.g., one out of every six resource elements such that the PRS may be sent on the first resource element, the seventh resource element, the thirteenth resource element, and so on). In this manner, assuming that the channel does not substantially or significantly change across a few OFDM symbols, using staggered combs to send PRS in adjacent OFDM symbols may allow the PRS to be received on all frequency tones. However, LTE and other legacy wireless networks tend to be restricted to using six (6) staggered combs in a slot (e.g., because applicable standards define certain signals such as Cell-specific Reference Signals (CRS) that use a specific comb, so the restriction allows that pattern to be maintained). In contrast, there may be more flexibility in wireless networks that utilize beamforming to communicate in mmW bands, such as the New RAN 220 described above. For example, denser combs may be used, which may result in a need for fewer OFDM symbols, which may in turn enable more PRS beams per slot (e.g., the number of staggered combs that can be used in a slot may be parameterized to any suitable value rather than being restricted to six). Furthermore, whereas six OFDM symbols with staggered combs would be needed to sample all the PRS resource elements, with denser combs fewer OFDM symbols are needed to cover all the PRS resource elements, which means that more PRS beams can exist in a given slot. For example, in the extreme case where all resource elements in the OFDM symbols are used, only one OFDM symbol may be needed. Each successive OFDM symbol could then be the same PRS but on a different beam, which means that there could be up to fourteen (14) different beams because there are 14 symbols per slot.

According to various aspects, based on at least the above-mentioned factors, there may be optimization opportunities through sharing UE beam-switching and other positioning-related capabilities with a network node configured to transmit one or more positioning-related reference signals. For example, a maximum number of beam switches per slot may be indicated per frequency range for each subcarrier spacing that the UE supports (e.g., a maximum number of beam switches per slot for a sub-6 GHz frequency range, for a mmW frequency range, etc.). Even within a given frequency range, there may be multiple bands (e.g., from 24-26 GHz may be one band, from 26-28 GHz may be another band, etc.). In general, the maximum number of beam switches may account for both transmit (Tx) beams and receive (Rx) beams across all configured serving cells. As such, the current standards define the maximum number of beam switches per slot according to a single global parameter, which does not adequately account for the notion that beam switching capabilities may differ in different contexts (e.g., a downlink only slot versus a combined uplink/downlink or an uplink only slot). For example, a given UE may signal a maximum of seven (7) beam switches per slot because the UE cannot handle more than 7 beam switches in certain scenarios (e.g., the UE may be unable to handle a total of eight beams split up into six downlink beams and two uplink beams, but the UE may have the ability to handle eight beams if the beams were all downlink beams). When a single global parameter is used, the UE would therefore have to use the most constricting capability and report a maximum of seven beam switches per slot even though the UE could potentially handle more than seven beam switches in certain specific scenarios. Furthermore, data may be disallowed altogether on slots that are dedicated to PRS in order to help to fully utilize the PRS slots for capable UEs. As such, PRS slots may be limited to downlink beams, meaning that more beam switches could potentially be handled in PRS slots. Alternatively, as noted above, because fewer OFDM symbols may be needed when denser combs are used, the remaining OFDM symbols in the slot could be used for data, which also increases overall utilization of the slot. As such, because the PRS itself may be more flexible in NR networks, more flexible PRS capability signaling may be desired to address the above-mentioned drawbacks whereby existing signaling to report UE positioning-related capabilities is substantially limited (e.g., to a single global parameter for maximum beam switches in NR networks and to signaling the ability to support OTDOA-based positioning and/or inter-frequency RSTD measurements in LTE networks). The benefits of the disclosed aspects include, among others, more flexible PRS, greater granularity control for beam switch which may allow for a variety of different devices, etc.

Figure 7A:
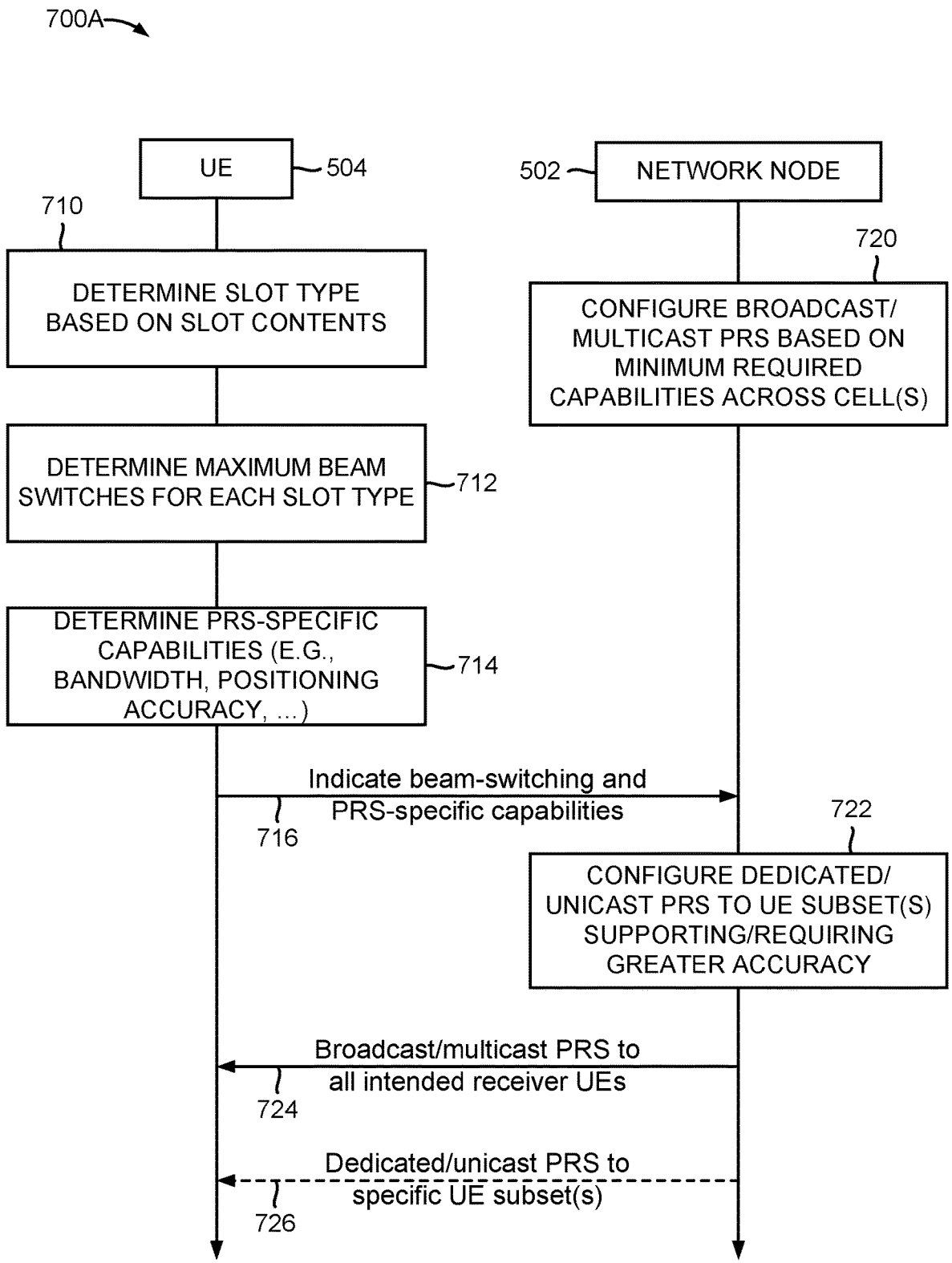
FIGS. 7A, 7B, and 7C illustrate exemplary signaling flows in which a UE may indicate beam-switching and other positioning-related capabilities to a network node that may transmit one or more positioning-related reference signals based on the indicated beam-switching and other positioning-related capabilities, according to various aspects of the disclosure.

According to various aspects, FIG. 7A illustrates an exemplary signaling flow 700A in which a UE 504 (e.g., the UE 350) may indicate beam-switching and other positioning-related capabilities to a network node 502 (e.g., the network node 310) that may be configured to transmit one or more positioning-related reference signals based on the UE-indicated capabilities. More particularly, as will be described in further detail herein, the UE 504—e.g., the RX processor 356, the controller/processor 359, and/or the TX processor 368 of the UE 350—may indicate a granular beam switch capability as a function of slot type, wherein the slot type may be based on slot contents. Accordingly, the UE 504 may still signal a maximum number of beam switches, but the maximum number of beam switches may have more granularity than a single parameter per band. In particular, as noted above, the UE 504 may indicate the maximum number of beam switches as a function of slot type, wherein the UE 504—e.g., the controller/processor 359 of the UE 350—may determine one or more possible slot types at block 710. For example, in various embodiments, the possible slot types may be uplink only, downlink only, mixed uplink/downlink (e.g., one or more downlink OFDM symbols followed by a gap switching band gap and then one or more uplink OFDM symbols, or vice versa), and/or based on a number of downlink/uplink switches (e.g., multiple downlink/uplink switches with gaps used in each switch between downlink/uplink frames).

Alternatively and/or additionally, the possible slot types may depend on slot contents (i.e., the signal(s) that are communicated in the slot), whereby there may be different slot types and therefore different beam switching capabilities depending on the slot contents. For example, the UE 504 may support a certain maximum number of beam switches for slots that contain PRS only, and support a different maximum number of beam switches for slots that contain PRS and other downlink signals that may be frequency division multiplexed and/or time division multiplexed with the PRS (e.g., the first few symbols may be used for PRS and the remaining symbols used for the other downlink signals, or a contiguous set of resource blocks assigned for PRS may take up less than the full bandwidth such that other downlink signals can be frequency division multiplexed with the PRS outside that bandwidth). Accordingly, as will be apparent to those skilled in the art, the beam switching capabilities may be different when the PRS is frequency division multiplexed and/or time division multiplexed with one or more downlink signals, as the PRS may be transmitted, e.g., beamswept, and the receiver may want to perform receive beamsweeping as well in order to receive each transmitted PRS beam with a different corresponding receive beam. As such, once the receiver has formed the receive beam(s) to receive the transmitted PRS beam(s) via analog beamforming, any other signals that are frequency division multiplexed with the PRS may also be received via the same receive beam(s). In other examples, a slot may contain PRS and one or more uplink signals, which would require the UE 504 to receive the PRS in the slot and then switch to an uplink (or vice versa), or the PRS may alternatively also be an uplink PRS (e.g., Sounding Reference Signals (SRS) used in an Uplink-Time Difference of Arrival (U-TDOA) positioning scheme).

Furthermore, in various embodiments, the content-dependent slot type(s) may not be limited to slots that contain PRS, as the slot type may depend on other possible slot contents. For example, in various embodiments, a given slot may contain a Physical Downlink Shared Channel (PDSCH) and/or a Physical Downlink Control Channel (PDCCH), a Physical Uplink Shared Channel (PUSCH) and/or a Physical Uplink Control Channel (PUCCH), Channel State Information Reference Signals (CSI-RS), SRS, and/or other suitable contents. In particular, a slot that only contains PDSCH may have a different slot type relative to a slot that contains PDSCH and PDCCH, a slot that only contains PUSCH may have a different type than a slot that contains both PUSCH and PUCCH, and so on. Further still, the slot type may depend on whether the slot contents were statically, semi-statically, or dynamically scheduled. For example, in dynamically scheduled content, the UE 504 may receive and process a grant indicating that a downlink or uplink packet is scheduled on a given receive/transmit beam at a given time such that the UE 504 is prepared to receive or send the packet via the appropriate receive/transmit beam at the given time. But in semi-statically scheduled content, the slot resources are configured ahead of time, but the resources are activated as needed and deactivated. In general, the UE 504 may need sufficient time (provided by a scheduling delay) to prepare the appropriate beam in the appropriate direction before the given time, whereby the number of beam switches that the UE 504 can handle may depend on how much time the UE 504 is given to prepare the appropriate beam. On the other hand, for content that is scheduled statically or semi-statically, the UE 504 may know about the scheduled content well ahead of time. As such, if the slot contents are dynamically scheduled, the slot type may also be a function of the scheduling delay (e.g., a sufficiently large delay could be treated the same way as semi-statically scheduled content).

As such, in various embodiments, the UE 504 may generally have a certain maximum number of beam switches for each possible slot type determined at block 710. Accordingly, at block 712, the UE 504—e.g., the controller/processor 359 of the UE 350—may determine the maximum number of beam switches that the UE 504 can support per slot as a function of slot type, which may be indicated to the network node 502, as depicted at 716—e.g., by the controller/processor 359 and/or the TX processor 368 of the UE 350. Furthermore, in various embodiments, the beam-switching capability indicated at 716 may indicate the beam-switching at a high level of granularity (e.g., for each or one or more of the slot types noted above), or the beam-switching capability may be indicated more generally (e.g., a maximum number of PRS beam switches per slot, which could be separate or joint for uplink PRS beams and downlink PRS beams).

According to various aspects, referring now to block 714, the UE 504—e.g., the controller/processor 359 of the UE 350—may further determine one or more PRS-specific capabilities that are related to one or more other capabilities associated with the UE 504 (e.g., bandwidth, desired positioning accuracy, etc.), which may also be indicated to the network node 502 at 716. For example, as noted above, the UE 504 may indicate a maximum number of PRS beam switches supported per slot, which may be determined as a function of a total number of beam switches that the UE 504 can support in a given slot (e.g., if the UE 504 can support N beam switches per slot, the UE 504 should be able to support at least the same number and likely more PRS beam switches per slot because the PRS is specifically configured and more easily received).

According to various aspects, the PRS-specific capabilities may be determined at block 714 with reference to other capabilities associated with the UE 504 because the PRS may potentially have different configurations (e.g., a number of slots repeated, whether frequency division multiplexing is allowed or disallowed in PRS slots, a number of beams per slot, PRS bandwidth, etc.), and further because all UEs may not be required to support all possible parameter combinations. As such, because capabilities related to various UE parameters are already defined, the PRS-specific capabilities that are determined at block 714 may be tied or otherwise related to such capabilities and/or parameters. For example, in various embodiments, the PRS-specific capabilities may be related to bandwidth capabilities, a total number of beam switches supported per slot, positioning accuracy requirements, frequency division multiplexed reception of multiple signals, capabilities per frequency band, and/or other suitable capabilities. For example, if the UE 504 supports a bandwidth larger than a defined threshold, then the UE 504 may also be capable of receiving wideband PRS spanning that entire bandwidth. On the other hand, if the UE 504 supports a low bandwidth (e.g., below a given threshold), the UE 504 may support up to a certain PRS bandwidth that is a function of the bandwidth supported at the UE 504. Alternatively, the PRS bandwidth may be made an explicit parameter (e.g., a supported bandwidth specific to PRS, which may be different from the overall bandwidth that the UE 504 supports). For example, if the UE 504 is in connected mode, then the UE 504 may be limited by whichever bandwidth is larger, as the UE 504 accesses at least that much system bandwidth to receive incoming communications and should therefore be able to receive any PRS in that range. However, in idle mode, the UE 504 does not have any data to receive and is instead waking up periodically to receive some synchronization signals and possibly PRS. As such, when in idle mode, the UE 504 can open up only the PRS-specific bandwidth if the PRS-specific bandwidth is smaller than the full bandwidth supported at the UE 504.

According to various aspects, as noted above, the PRS-specific capabilities determined at block 714 may also be related to positioning accuracy requirements at the UE 504. For example, in various embodiments, the UE 504 may signal a desired positioning accuracy, which could be dynamic depending on context (e.g., higher accuracy may be needed when walking versus driving, when indoors versus outdoors, when the UE 504 is a drone/robot that is landing/docking to a power source, etc.). As such, when the UE 504 requires greater positioning accuracy, e.g., higher accuracy in OTDOA and/or RSTD measurements, some ways to achieve the improved accuracy may be through receiving PRS from more sites, with higher power, with higher PRS bandwidth, on denser PRS combs, etc., meaning that the UE 504 must have the capability to receive PRS having such configurations. Accordingly, when the UE 504 signals certain positioning accuracy requirements, the desired positioning accuracy can be tied or otherwise related to certain PRS capabilities (e.g., from more sites, with higher power, with higher PRS bandwidth, on denser PRS combs, etc.).

According to various aspects, as noted above, the PRS-specific capabilities determined at block 714 may also be related to frequency division multiplexed (FDM) reception of multiple signals (e.g., where frequency division multiplexing of other data is allowed in PRS slots). For example, if the UE 504 supports FDM reception of transmitted or beamswept CSI-RS (SSB) with PDSCH, then the UE 504 may also support FDM reception of transmitted or beam-swept PRS with PDSCH and/or CSI-RS (SSB). In particular, in order to receive the CSI-RS (SSB) with the best possible beamform, the UE 504 may perform beam training to try out different receive beams, some of which may be better than others. As such, while the UE 504 is performing the beam training to try out the different receive beams, all the data received in that time will have the same beamforming if data is FDMed with the CSI-RS (SSB) because of the analog beamforming constraint. During the time when the UE 504 is experimenting with the various receive beams for the CSI-RS (SSB), reception of PDSCH packets may suffer. On the other hand, where the UE 504 has two or more separate receive chains, the UE 504 may have the ability to form separate receive beams to receive the CSI-RS (SSB) and the PDSCH packets, and the same multi-signal reception capability may apply to PRS that is frequency division multiplexed with one or more other signals.

According to various aspects, as noted above, any of the above-mentioned PRS-specific capabilities that are related to other capabilities associated with the UE 504 may also be determined at block 714 per frequency band. For example, positioning accuracy that the UE 504 can achieve, the number of base stations that can be seen, supported bandwidths, etc. may be different in different frequency bands (e.g., sub-6 GHz bands versus mmW bands). As such, in various embodiments, the manner in which the above UE capabilities (e.g., supported bandwidth, positioning accuracy, FDM reception, etc.) are related to PRS-specific capabilities could also be a function of frequency band.

According to various aspects, referring to FIG. 7A, the signaling flow 700A illustrated therein will now be described from the perspective of the network node 502 (e.g., the network node 310) that may be configured to transmit one or more positioning-related reference signals based on the UE capabilities that are indicated at 716 and received by the network node 502—e.g., the RX processor 370 and/or the controller/processor 375 of the network node 310. In general, as noted above, the network node 502 may be a base station (e.g., a gNB), a cell of a base station, a remote radio head, an antenna of a base station where the locations of the antennas of a base station are distinct from the location of the base station itself, etc.

The network node 502 may generally have to serve various UEs that likely have different capabilities (e.g., different maximum numbers of PRS beam switches per slot). Accordingly, at block 720, the network node 502—e.g., the controller/processor 375 of the network node 310—may configure broadcast/multicast PRS that all or some (i.e., one or more) intended receiver UEs (including at least the UE 504) are capable of receiving based on the minimum required capabilities of the intended receiver UEs to hear the PRS. Furthermore, because the intended receiver UEs may need to receive PRS from multiple geographically separated sites, the configuration determined at block 720 may be coordinated across multiple cells (e.g., all cells in a paging area or in a given geographical deployment). Accordingly, as depicted at 724, the network node 502—e.g., the controller/processor 375 and/or the TX processor 316 of the network node 310—may broadcast/multicast the PRS configured at block 720 to all intended receiver UEs (including at least UE 504). The UE 504—e.g., the RX processor 356 and/or the controller/processor 359 of the UE 350—may receive the broadcast/multicast.

However, for UEs that may have different (e.g., greater or less) capabilities and/or accuracy requirements than the minimum provided for in the broadcast/multicast PRS configured at block 720, the network node 502—e.g., the controller/processor 375 of the network node 310—may further configure dedicated/unicast PRS for those UEs with the different capabilities and/or accuracy requirements at block 722 (e.g., additional PRS with wider bandwidth or less PRS with narrower bandwidth). As depicted at 726, the network node 502—e.g., the controller/processor 375 and/or the TX processor 316 of the network node 310—may further transmit the dedicated/unicast PRS configured at block 722 to specific UE subsets based on capabilities and/or accuracy requirements specific to those UE subsets. Furthermore, as will be apparent to those skilled in the art, the dedicated/unicast PRS transmitted at 726 may optionally be transmitted to the UE 504 to the extent that the UE 504 indicates at 716 certain capabilities and/or accuracy requirements that place the UE 504 into one or more of the appropriate subsets for which the dedicated/unicast PRS was configured. In this manner, the PRS specifically configured for higher accuracy and/or greater UE capabilities may not waste resources across the entire cell, as the specifically configured PRS is only transmitted to the subset(s) of UEs that have the appropriate capabilities and/or accuracy requirements for which the dedicated/unicast PRS was configured.

Figure 7B:
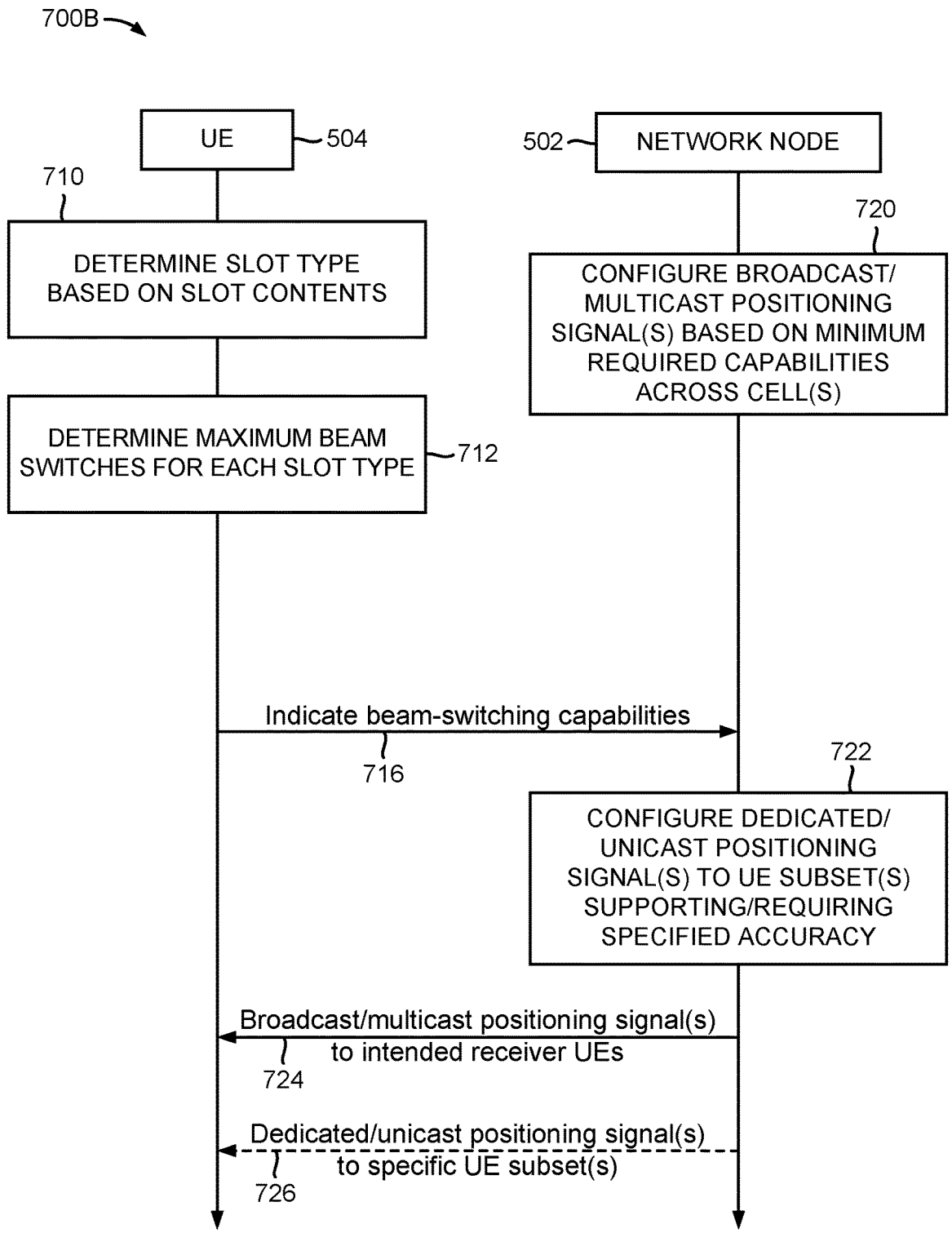
Figure 7C:
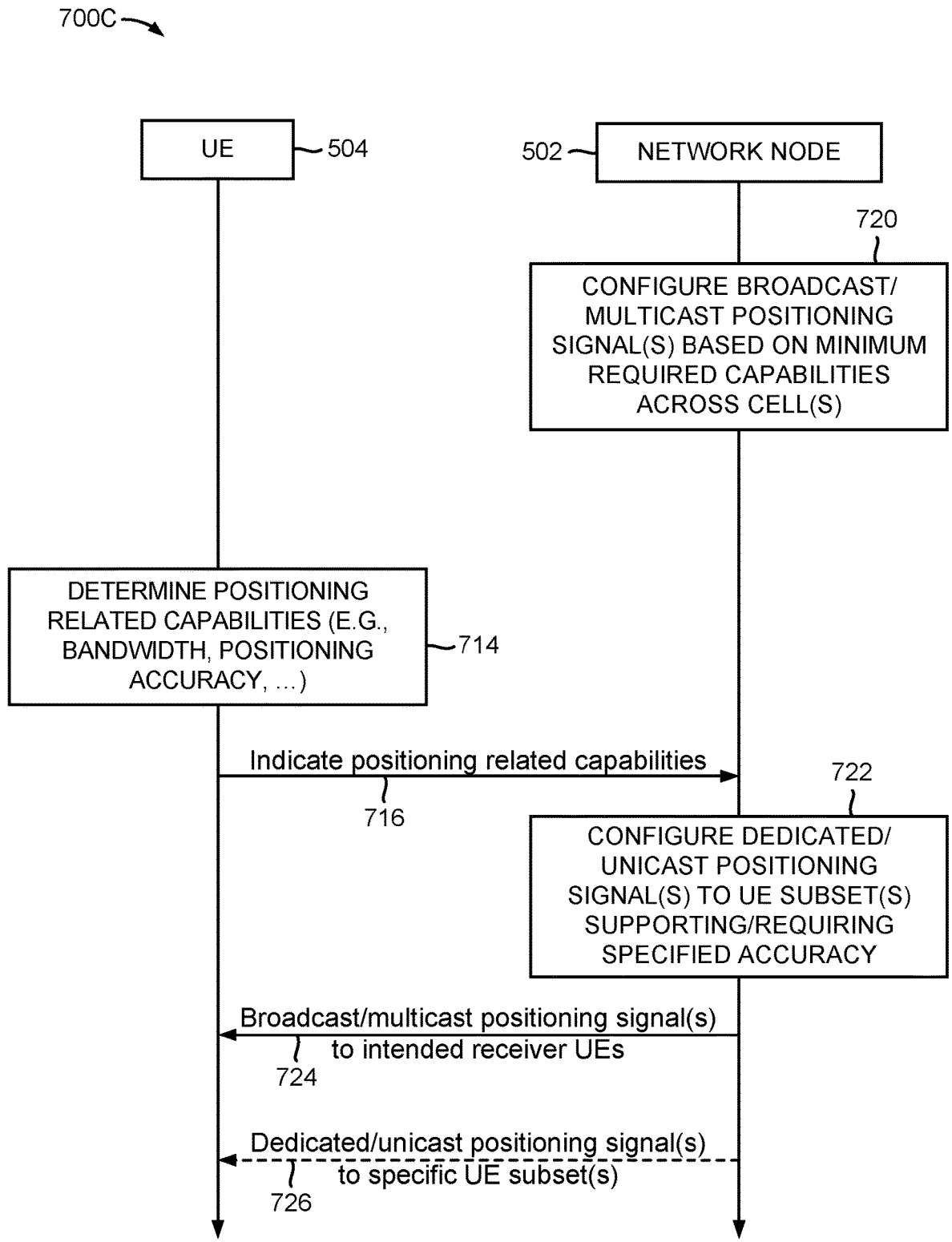

But as seen in FIGS. 7B and 7C, each signaling flow may be performed independently. FIG. 7B illustrates a signaling flow 700B in which the UE 504 may indicate beam-switching capabilities to the network node 502 based on slot types. On the other hand, FIG. 7C illustrates a signaling flow 700C in which the UE 504 may indicate beam-switching capabilities to the network node 502 based on one or more other capabilities associated with the UE to receive signals across a number of beams. FIG. 7A may be viewed as a combination of FIGS. 7B and 7C.

Figure 8:
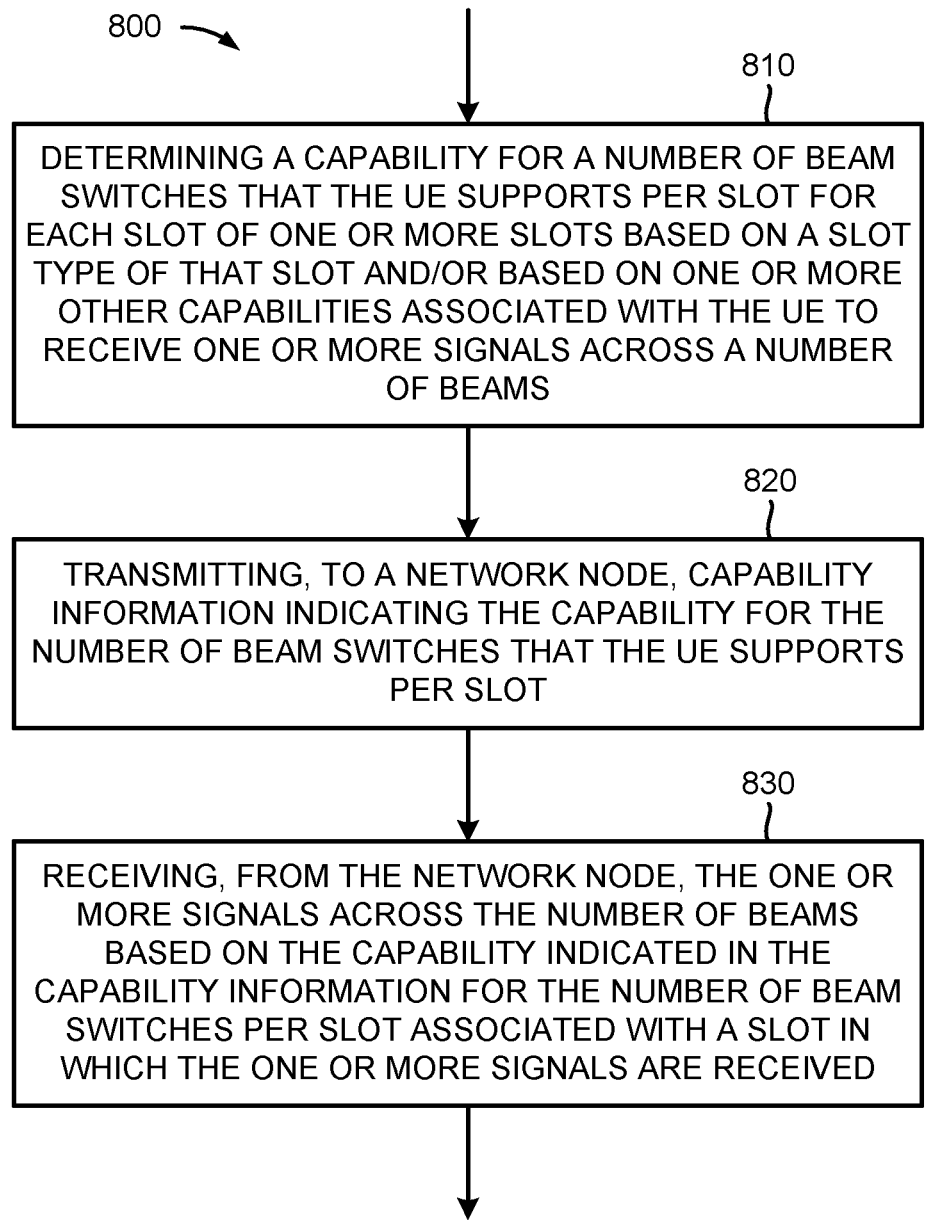
FIG. 8 illustrates a flowchart of an exemplary method performed by a UE for indicating beam-switching capabilities according to various aspects of the disclosure.

FIG. 8 illustrates an exemplary method 800 performed by a UE, such as the UE 350, 504. At block 810, the UE may determine a capability for a number of beam switches that the UE supports per slot for each slot of one or more slots based on a slot type of that slot and/or based on one or more other capabilities associated with the UE to receive one or more signals across a number of beams. For example, such capabilities may be preconfigured by OEM, the network operator, carrier, etc. Block 810 may correspond to blocks 710, 712, and/or 714 of FIGS. 7A, 7B, and/or 7C. In an aspect, means to perform block 810 may include the RX processor 356 and/or the controller/processor 359 of the UE 350 illustrated in FIG. 3.

The slot type may be one or more of an uplink only slot, a downlink only slot, or a mixed uplink and downlink slot. Alternatively or in addition thereto, the slot type may be based on a number of switches between a downlink and an uplink in a mixed uplink and downlink slot. The slot type may depend on whether the slot contains positioning reference signals (PRS) only, the PRS and one or more downlink signals, the PRS and one or more uplink signals, one or both of Physical Downlink Shared Channel (PDSCH) and Physical Downlink Control Channel (PDCCH), one or both of Physical Uplink Shared Channel (PUSCH) and Physical Uplink Control Channel (PUCCH), Channel State Information Reference Signals (CSI-RS), or Sounding Reference Signals (SRS). Alternatively or in addition thereto, the slot type may depend on whether one or more signals transmitted in the slot are semi-statically or dynamically scheduled. The one or more other capabilities associated with the UE may include one or more of supported bandwidth, a total number of supported beam switches per slot, a desired positioning accuracy, or a capability to receive multiple signals in a single beam via frequency division multiplexing. The one or more other capabilities associated with the UE may be indicated for a particular frequency band.

At block 820, the UE may transmit, to a network node, such as the network node 310, 502, capability information indicating the capability for the number of beam switches that the UE supports per slot. Block 820 may correspond to flow 716 of FIGS. 7A, 7B, and/or 7C. In an aspect, means to perform block 810 may include the TX processor 368 and/or the controller/processor 359 of the UE 350 illustrated in FIG. 3.

The capability information may indicate the number of beam switches that the UE supports per slot according to a maximum number of PRS beams per slot. For example, the number of beam switches that the UE supports for a slot may be any number up to the maximum number of PRS beams for the slot.

At block 830, the UE may receive, from the network node, the one or more signals across the number of beams based on the capability indicated in the capability information for the number of beam switches per slot associated with a slot in which the one or more signals are received.

Block 830 may correspond to flows 724 and/or 726 of FIGS. 7A, 7B, and/or 7C. In an aspect, means to perform block 810 may include the RX processor 356 and/or the controller/processor 359 of the UE 350 illustrated in FIG. 3.

The number of beams across which the one or more signals are received may comprise one or more beams that are broadcasted or multicasted by the network node to one or more intended receivers based on minimum required capabilities of the one or more intended receivers to receive the one or more transmitted signals. Some or all of the intended receivers may be within a geographic location, such as across a cell. Alternatively or in addition thereto, the number of beams across which the one or more signals are received may comprise one or more beams that are unicasted by the network node to the UE or dedicated by the network node to a subset of UEs that includes at least the UE, based on the capability information indicating a requirement for different accuracy than provided for in the minimum required capabilities of the one or more intended receivers.

In an aspect, the memory 360 may be an example of a computer-readable medium that stores computer executable instructions for one or more of the TX processor 368, the controller/processor 358, and/or the RX processor 356 of the UE 350 to perform the method 800.

Figure 9:
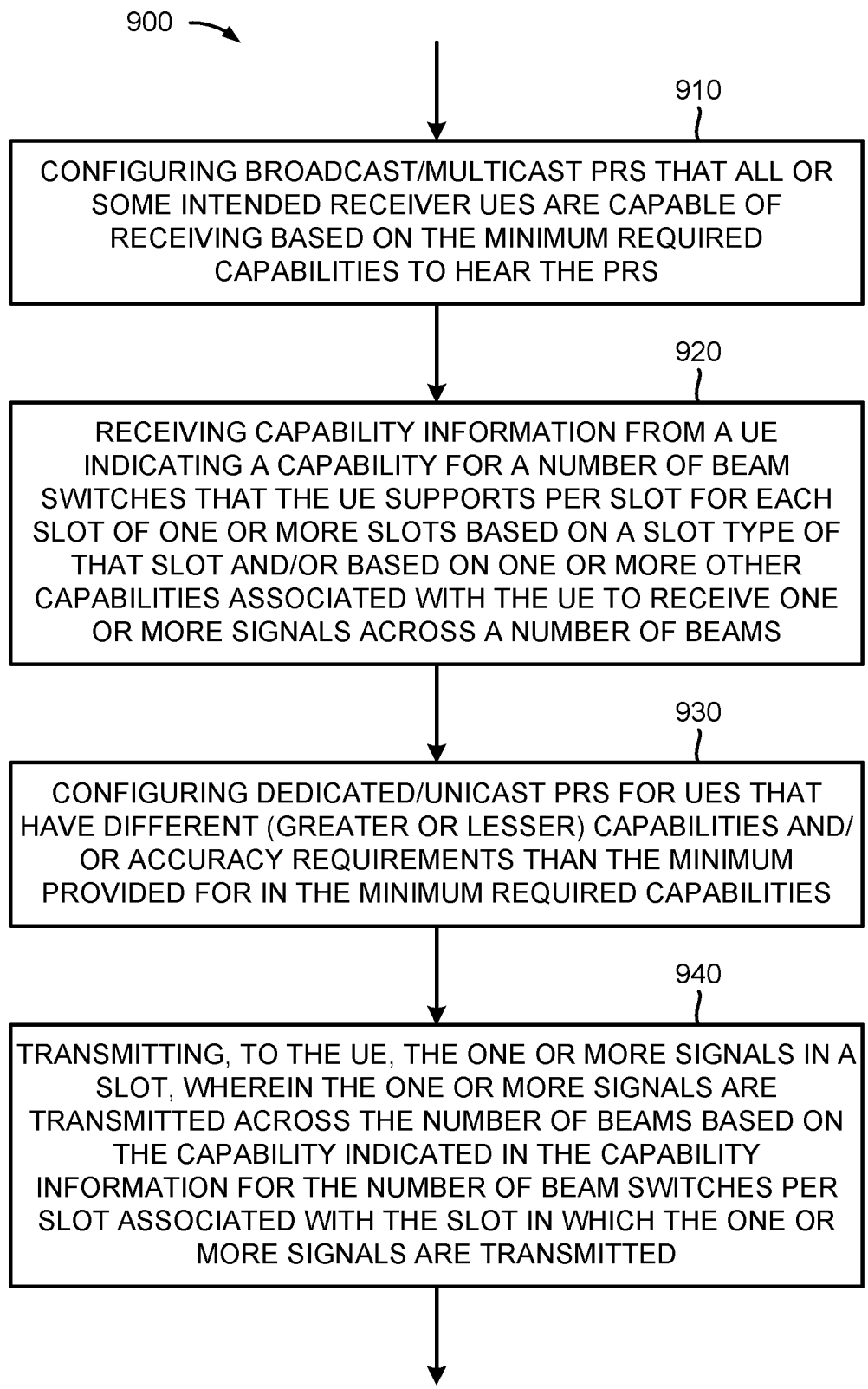
FIG. 9 illustrates a flowchart of an exemplary method performed by a network node for transmitting beamformed signals according to various aspects of the disclosure.

FIG. 9 illustrates an exemplary method 900 performed by a network node, such as the network node 310, 502. At block 910, the network node may configure broadcast/multicast PRS that all or some (i.e., one or more) intended receiver UEs (including at least the UE 504) are capable of receiving based on the minimum required capabilities to hear the PRS. Block 910 may correspond to block 720 of FIGS. 7A, 7B, and/or 7C. In an aspect, means to perform block 910 may include the controller/processor 375 of the network node 310 illustrated in FIG. 3.

At block 920, the network node may receive capability information from a UE, such as the UE 350, 504, indicating a capability for a number of beam switches that the UE supports per slot for each slot of one or more slots based on a slot type of that slot and/or based on one or more other capabilities associated with the UE to receive one or more signals across a number of beams. Block 920 may correspond to flow 716 of FIGS. 7A, 7B, and/or 7C. In an aspect, means to perform block 910 may include the RX processor 370 and/or the controller/processor 375 of the network node 310 illustrated in FIG. 3.

The slot type may be one or more of an uplink only slot, a downlink only slot, or a mixed uplink and downlink slot. Alternatively or in addition thereto, the slot type may be based on a number of switches between a downlink and an uplink in a mixed uplink and downlink slot. The slot type may depend on whether the slot contains positioning reference signals (PRS) only, the PRS and one or more downlink signals, the PRS and one or more uplink signals, one or both of Physical Downlink Shared Channel (PDSCH) and Physical Downlink Control Channel (PDCCH), one or both of Physical Uplink Shared Channel (PUSCH) and Physical Uplink Control Channel (PUCCH), Channel State Information Reference Signals (CSI-RS), or Sounding Reference Signals (SRS). Alternatively or in addition thereto, the slot type may depend on whether one or more signals transmitted in the slot are semi-statically or dynamically scheduled. The transmitted information may indicate the number of beam switches that the UE supports per slot according to a maximum number of PRS beams per slot. The one or more other capabilities associated with the UE may include one or more of supported bandwidth, a total number of supported beam switches per slot, a desired positioning accuracy, or a capability to receive multiple signals in a single beam via frequency division multiplexing. The one or more other capabilities associated with the UE may be indicated for a particular frequency band.

At block 930, the network node may configure dedicated/unicast PRS for those UEs that may have different (e.g., greater or less) capabilities and/or accuracy requirements than the minimum provided for in the minimum required capabilities, (e.g., additional PRS with wider bandwidth or less PRS with narrower bandwidth). That is, the network node may configure dedicated/unicast PRS than the configured broadcast/multicast PRS. Block 930 may correspond to block 722 of FIGS. 7A, 7B, and/or 7C. In an aspect, means to perform block 930 may include the controller/processor 375 of the network node 310 illustrated in FIG. 3.

At block 940, the network node may transmit, to the UE, the one or more signals in a slot. The one or more signals may be transmitted across the number of beams based on the indicated capability for the number of beam switches per slot associated with the slot in which the one or more signals are transmitted. Block 940 may correspond to flows 724 and/or 726 of FIGS. 7A, 7B, and/or 7C. In an aspect, means to perform block 940 may include the TX processor 316 and/or the controller/processor 375 of the network node 310 illustrated in FIG. 3.

The number of beams across which the one or more signals are transmitted may comprise one or more beams that are broadcasted or multicasted to one or more intended receivers based on the minimum required capabilities of the one or more intended receivers to receive the one or more transmitted signals. Some or all of the intended receivers may be within a geographic location, such as across a cell. Alternatively or in addition thereto, the number of beams across which the one or more signals are transmitted may comprise one or more beams that are unicasted to the UE or dedicated to a subset of UEs that includes at least the UE, based on the capability information indicating a requirement for different accuracy than provided for in the minimum required capabilities of the one or more intended receivers.

In an aspect, the memory 376 may be an example of a computer-readable medium that stores computer executable instructions for one or more of the TX processor 316, the controller/processor 375, and/or the RX processor 370 of the network node 310 to perform the method 900.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of a user equipment (UE), the method comprising:
    determining a capability for a maximum number of beam switches that the UE supports per slot for each slot of one or more slots,
    wherein the maximum number of beam switches is based on a slot type of that slot and/or based on one or more other capabilities associated with the UE to receive one or more signals across one or more beams;
    transmitting, to a network node, capability information comprising the determined capability for the maximum number of beam switches that the UE supports per slot; and
    receiving, from the network node, the one or more signals across one or more beams based on the determined capability for the maximum number of beam switches per slot associated with a slot in which the one or more signals are received.

2. The method recited in claim 1,
    wherein the slot type is of
        an uplink only slot,
        a downlink only slot, or
        a mixed uplink and downlink slot, and/or
    wherein the slot type is based on a number of switches between a downlink and an uplink in a mixed uplink and downlink slot.

3. The method recited in claim 1,
    wherein the slot type depends on whether the slot contains
        positioning reference signals (PRS) only,
        the PRS and one or more downlink signals,
        the PRS and one or more uplink signals,
        one or both of a Physical Downlink Shared Channel (PDSCH) and a Physical Downlink Control Channel (PDCCH),
        one or both of a Physical Uplink Shared Channel (PUSCH) and a Physical Uplink Control Channel (PUCCH),
        Channel State Information Reference Signals (CSI-RS), or
        Sounding Reference Signals (SRS), and/or
    wherein the slot type depends on whether one or more signals transmitted in the slot are semi-statically or dynamically scheduled.

4. The method recited in claim 1,
    wherein the capability information indicates the maximum number of beam switches that the UE supports per slot according to a maximum number of positioning reference signals (PRS) beams per slot.

5. The method recited in claim 1,
wherein the one or more other capabilities associated with the UE include one or more of
supported bandwidth,
a total number of supported beam switches per slot,
a desired positioning accuracy, or
a capability to receive multiple signals in a single beam via frequency division multiplexing.

6. The method recited in claim 1,
wherein the one or more other capabilities associated with the UE are indicated in the capability information for a particular frequency band.

7. The method recited in claim 1,
wherein the one or more beams across which the one or more signals are received comprise one or more beams that are broadcasted or multicasted by the network node to one or more intended receivers based on minimum required capabilities of the one or more intended receivers to receive the one or more transmitted signals.

8. The method recited in claim 1,
wherein the one or more beams across which the one or more signals are received comprise
one or more beams that are
unicasted by the network node to the UE or
dedicated by the network node to a subset of UEs that includes at least the UE,
based on the capability information indicating a requirement for different accuracy than provided for in minimum required capabilities of one or more intended receivers.

9. A user equipment (UE), comprising:
at least one processor configured to determine a capability for a maximum number of beam switches supported by the UE per slot for each slot of one or more slots,
wherein the maximum number of beam switches is based on a slot type of that slot and/or based on one or more other capabilities associated with the UE to receive one or more signals across one or more beams;
a transmitter configured to transmit, to a network node, capability information comprising the determined capability for the maximum number of beam switches supported by the UE per slot; and
a receiver configured to receive, from the network node, one or more signals across one or more beams based on the determined capability for the maximum number of beam switches per slot associated with a slot in which the one or more signals are received.

10. The UE recited in claim 9,
wherein the slot type is one of
an uplink only slot,
a downlink only slot, or
a mixed uplink and downlink slot, and/or
wherein the slot type is based on a number of switches between a downlink and an uplink in a mixed uplink and downlink slot.

11. The UE recited in claim 9,
wherein the slot type depends on whether the slot contains
positioning reference signals (PRS) only,
the PRS and one or more downlink signals,
the PRS and one or more uplink signals,
one or both of a Physical Downlink Shared Channel (PDSCH) and a Physical Downlink Control Channel (PDCCH),
one or both of a Physical Uplink Shared Channel (PUSCH) and a Physical Uplink Control Channel (PUCCH),
Channel State Information Reference Signals (CSI-RS),
or Sounding Reference Signals (SRS), and/or
wherein the slot type depends on whether one or more signals transmitted in the slot are semi-statically or dynamically scheduled.

12. The UE recited in claim 9,
wherein the capability information indicates a supported number of beam switches per slot according to a maximum number of positioning reference signals (PRS) beams per slot.

13. The UE recited in claim 9,
wherein the one or more other capabilities associated with the UE include
one or more of supported bandwidth,
a total number of supported beam switches per slot,
a desired positioning accuracy, or
a capability to receive multiple signals in a single beam via frequency division multiplexing.

14. The UE recited in claim 9,
wherein the one or more other capabilities associated with the UE are indicated in the capability information for a particular frequency band.

15. The UE recited in claim 9,
wherein the one or more beams across which the one or more signals are received comprise one or more beams that are broadcasted or multicasted by the network node to one or more intended receivers based on minimum required capabilities of the one or more intended receivers to receive the one or more transmitted signals.

16. The UE recited in claim 9,
wherein the one or more beams across which the one or more signals are transmitted comprise one or more beams that are unicasted by the network node to the UE or dedicated by the network node to a subset of UEs that includes at least the UE, based on the capability information indicating a requirement for different accuracy than provided for in minimum required capabilities of one or more intended receivers.

17. A method of a network node, the method comprising:
receiving, from a user equipment (UE), capability information comprising a capability for a maximum number of beam switches that the UE supports per slot for each slot of one or more slots,
wherein the maximum number of beam switches is based on a slot type of that slot and/or based on one or more other capabilities associated with the UE to receive one or more signals across one or more beams; and
transmitting, to the UE, the one or more signals in a slot,
wherein the one or more signals are transmitted across one or more beams based on the capability for the maximum number of beam switches per slot associated with the slot in which the one or more signals are transmitted.

18. The method recited in claim 17,
wherein the slot type is one of
an uplink only slot,
a downlink only slot, or
a mixed uplink and downlink slot, and/or
wherein the slot type is based on a number of switches between a downlink and an uplink in a mixed uplink and downlink slot.

19. The method recited in claim 17,
wherein the slot type depends on whether the slot contains
positioning reference signals (PRS) only,
the PRS and one or more downlink signals,
the PRS and one or more uplink signals, one or both of a Physical Downlink Shared Channel (PDSCH) and a Physical Downlink Control Channel (PDCCH),
one or both of a Physical Uplink Shared Channel (PUSCH) and a Physical Uplink Control Channel (PUCCH),
Channel State Information Reference Signals (CSI-RS), or
Sounding Reference Signals (SRS), and/or
wherein the slot type depends on whether one or more signals transmitted in the slot are semi-statically or dynamically scheduled.

20. The method recited in claim 17,
wherein the capability information indicates the maximum number of beam switches that the UE supports in the slot having the defined slot type according to a maximum number of positioning reference signals (PRS) beams per slot.

21. The method recited in claim 17,
wherein the one or more other capabilities associated with the UE include one or more of
supported bandwidth,
a total number of supported beam switches per slot,
a desired positioning accuracy, or
a capability to receive multiple signals in a single beam via frequency division multiplexing, and/or
wherein the one or more other capabilities associated with the UE are indicated in the capability information for a particular frequency band.

22. The method recited in claim 17,
wherein the one or more beams across which the one or more signals are transmitted comprise one or more beams that are broadcasted or multicasted to one or more intended receivers based on minimum required capabilities of the one or more intended receivers to receive the one or more transmitted signals.

23. The method recited in claim 17,
wherein the one or more beams across which the one or more signals are transmitted comprise one or more beams that are unicasted to the UE or dedicated to a subset of UEs that includes at least the UE based on the capability information indicating a requirement for different accuracy than provided for in minimum required capabilities of one or more intended receivers.

24. A network node, comprising:
a receiver configured to receive, from a user equipment (UE), capability information comprising a capability for a maximum number of beam switches that the UE supports per slot for each slot of one or more slots,
wherein the maximum number of beam switches is based on a slot type of that slot and/or based on one or more other capabilities associated with the UE to receive one or more signals across one or more beams; and
a transmitter configured to transmit, to the UE, the one or more signals in a slot,
wherein the one or more transmitted signals are transmitted across one or more beams based on the capability for the maximum number of beam switches per slot associated with the slot in which the one or more signals are transmitted.

25. The network node recited in claim 24,
wherein the slot type is one of
an uplink only slot,
a downlink only slot, or
a mixed uplink and downlink slot, and/or
wherein the slot type is based on a number of switches between a downlink and an uplink in a mixed uplink and downlink slot.

26. The network node recited in claim 24,
wherein the slot type depends on whether the slot contains positioning reference signals (PRS) only, the PRS and one or more downlink signals, the PRS and one or more uplink signals, one or both of a Physical Downlink Shared Channel (PDSCH) and a Physical Downlink Control Channel (PDCCH), one or both of a Physical Uplink Shared Channel (PUSCH) and a Physical Uplink Control Channel (PUCCH), Channel State Information Reference Signals (CSI-RS), or Sounding Reference Signals (SRS), and/or
wherein the slot type depends on whether one or more signals transmitted in the slot are semi-statically or dynamically scheduled.

27. The network node recited in claim 24,
wherein the capability information indicates the maximum number of beam switches that the UE supports in the slot having the defined slot type according to a maximum number of positioning reference signals (PRS) beams per slot.

28. The network node recited in claim 24,
wherein the one or more other capabilities associated with the UE include one or more of supported bandwidth, a total number of supported beam switches per slot, a desired positioning accuracy, or a capability to receive multiple signals in a single beam via frequency division multiplexing, and/or
wherein the one or more other capabilities associated with the UE are indicated in the capability information for a particular frequency band.

29. The network node recited in claim 24,
wherein the of one or more beams across which the one or more signals are transmitted comprise one or more beams that are broadcasted or multicasted to one or more intended receivers based on minimum required capabilities of the one or more intended receivers to receive the one or more transmitted signals.

30. The network node recited in claim 24,
wherein the of one or more beams across which the one or more signals are transmitted comprise one or more beams that are unicasted to the UE or dedicated to a subset of UEs that includes at least the UE based on the capability information indicating a requirement for different accuracy than provided for in minimum required capabilities of one or more intended receivers.

* * * * *